UNITED STATES PATENT OFFICE.

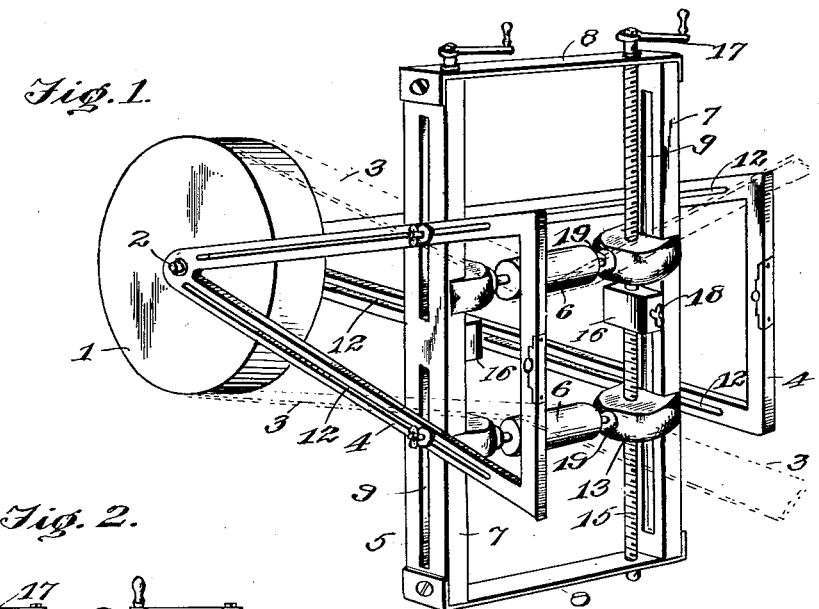
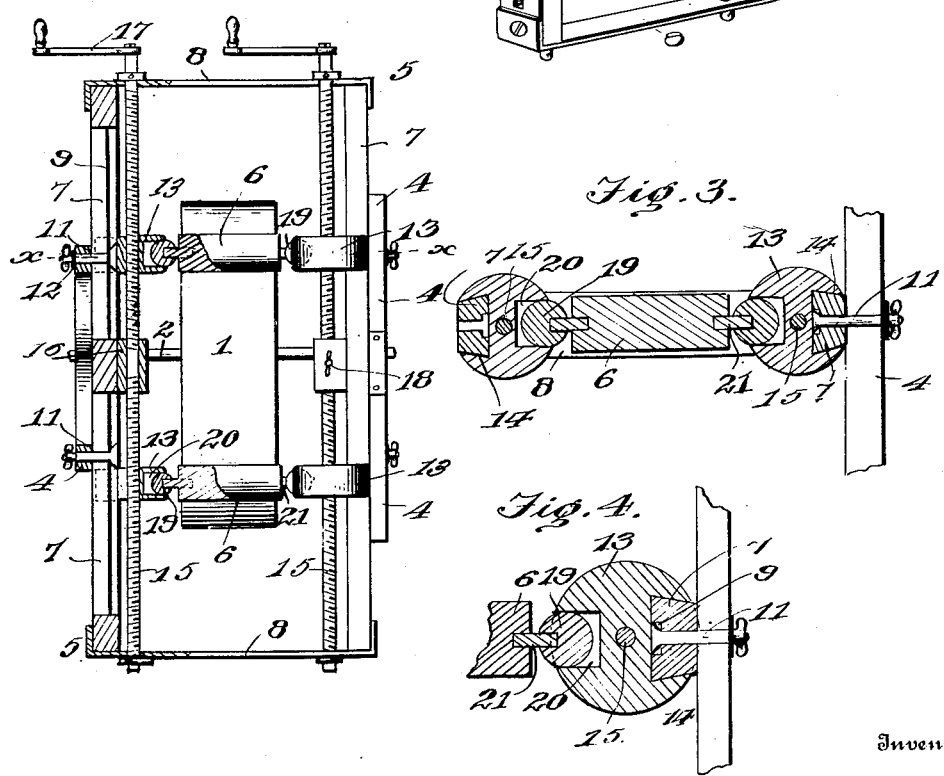

WASHINGTON B. PARRISH, OF KARA, VIRGINIA.

BELT-TIGHTENER.

No. 888,031.　　　　Specification of Letters Patent.　　　　Patented May 19, 1908.

Application filed October 18, 1907. Serial No. 397,993.

*To all whom it may concern:*

Be it known that I, WASHINGTON B. PARRISH, citizen of the United States, residing at Kara, in the county of Lunenburg and State of Virginia, have invented certain new and useful Improvements in Belt-Tighteners, of which the following is a specification.

This invention relates to means for maintaining drive belts under proper tension and obviating injury thereto by contraction in damp weather and preventing slipping of the belt due to expansion thereof in dry weather.

The invention provides an appliance which may be mounted upon the shaft of the drive pulley so as to be supported thereby and held in relatively fixed position with reference to the pulley and the belt to be tightened.

The invention consists of a supporting structure, a frame having adjustable connection with the supporting structure, pulleys for engaging with the runs of the belt to be tightened, and adjusting means for moving said pulleys either to vary the distance between them or to cause one pulley to incline more or less with reference to the other, as may be desired to meet existing conditions and to cause the drive belt to adhere to the drive pulley to prevent displacement therefrom.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a perspective view of a belt tightener embodying the invention. Fig. 2 is a front view of the belt tightener, the side frames of the supporting structure being in section and parts of the pulley frame being broken away. Fig. 3 is a horizontal section on the line x—x of Fig. 2. Fig. 4 is a sectional view of a side portion of the belt tightener similar to Fig. 3, showing the parts on a larger scale.

Corresponding and like parts are referred to in the following description and indicated in all the views of the drawings by the same reference characters.

The belt or drive pulley 1 may be of any design and mounted upon its supporting shaft 2 in any manner. The drive belt 3 may be such as usually employed for transmitting power from one pulley to another.

The belt tightener comprises a supporting structure consisting of side frames 4, a pulley frame 5, belt engaging pulleys 6 and mountings and adjusting means for said pulleys 6. The side frames 4 are of triangular form, the inclined bars being slotted to receive the bolts or fastenings by means of which the pulley frame is adjustably connected thereto, said pulley frame also serving to connect the frames 4 and in conjunction therewith provide a substantial framework for supporting the pulleys 6 and the mountings and adjusting means therefor. The frames 4 are provided with bearings both at their apexes and bases to receive the shaft 2 as may be found most advantageous or convenient, said bearings embodying removable caps and boxes of Babbitt metal. The frames 4 are preferably of cast metal, although they may be constructed of any suitable material so as to provide a substantial construction.

The pulley frame 5 is of rectangular formation and consists of side bars 7 and end bars 8, the side bars having slots 9 to receive the bolts or fastenings 11 by means of which the frames 4 and 5 are secured in any adjusted position, said bolts or fastenings 11 passing through the slots 12 provided in the inclined bars of the frames 4. The belt engaging pulleys 6 are mounted at their ends in bearings 13 which are adjustable on the bars 7 of the pulley frame to admit of varying the distance between said pulleys and to adjust their relative inclination. The bearings 13 are slidable on the bars 7 and are held thereto against displacement in any manner. The bars 7 are of wedge form in cross section and the bearings 13 have openings 14 of wedge form to fit the bar 7 so as to hold the bearings thereto and yet admit of their free movement. Set screws 15 are mounted in the end bars 8 of the pulley frame and in inner projections 16 and have screw thread connection with the respective bearings 13 so that rotation of said set screws will effect movement of the bearings 13 along the side bars 7 of the pulley frame. The set screws may be turned in any manner, as by means of cranks 17 fitted to the projecting ends thereof. To fix the position of the set screws, after the bearings 13 have been moved to the desired position, suitable means are provided, and as shown consist of thumb screws 18 threaded into openings of the inner projections 16 and adapted to engage at their inner ends with the set screws 15. It is desirable under some circumstances to adjust one bearing 13 to a greater or less extent than the opposite co-operating bearing, and in order to prevent binding between the journals of the belt engaging pulleys 6 and the bearings 13, a universal joint is interposed between said journals and bearings. This joint consists of a ball 19 and a socket 20, the latter being formed in the bearing 13 and of a size to receive the ball 19, the latter in turn having an opening to receive the journal 21 of the pulley 6. In the event of the bearings of a pulley 6 being adjusted unevenly, the balls 19 move in the sockets 20 and adapt themselves to the position of the said pulley 6, thereby preventing any possible binding between the journals 21 of the pulley 6 and the parts in which said journals are mounted.

The main supporting frame comprising the parts 4, is mounted upon the shaft 2 receiving the pulley 1 around which the belt 3 passes and to which the tightener is to be applied, the shaft 2 being mounted in the bearings of the frames 4 either at the angles thereof or the bearings provided at the bases according to convenience and as may be found to give the best results. The runs of the belt 3 pass between the pulleys 6 and by operating the set screws 15, said pulleys may be advanced or separated to subject the drive belt to the proper tension. When the belt tends to contract, as in damp weather, the set screws 15 may be turned to separate the pulley 6, thereby easing the tension on the drive belt so as to prevent abnormal strain thereon. On the other hand should the drive belt lengthen, as in dry weather or from use, the tension thereon may be increased by turning the set screws 15 to advance the pulleys 6. Should it be required to incline one or both runs of the drive belt to prevent the same slipping from the drive pulley, either one of the set screws 15 may be moved to throw the pulleys 6 at the desired relative inclination, the universal joint between the mounts of the pulleys 6 and their bearings 13 compensating for the change in position of the pulleys so as to prevent any binding between the journals 21 of the belt engaging pulleys 6 and the mounts of balls 19 in which the journals 21 are fitted.

The set screws 15 have their end portions oppositely threaded and are mounted in the bearings 16 and in the end bars 8 so as to be held against longitudinal movement. The inner ends of the set screws 18 may enter grooves in the portions of the set screws 15 mounted in the bearings 16 so as to prevent longitudinal movement of said set screws. By having the end portions of the set screws 65 oppositely threaded rotation of said set screws about their axes will effect simultaneous movement of the bearings 13 either towards or from one another.

Having thus described the invention, what is claimed as new is:

1. In a belt tightener, the combination of a frame comprising oppositely inclined bars, a pulley at the converging ends of said bars, a pulley frame having adjustable connection with the aforesaid oppositely inclined bars, spaced pulleys mounted upon the pulley frame and adapted to engage opposite runs of a belt passing around the aforesaid pulley, and means for varying the distance between said belt engaging pulleys.

2. In combination, a pulley frame comprising oppositely disposed bars of wedge form in cross section, bearings having openings of wedge form to receive said bars and form an interlocking joint therewith to prevent displacement, pulley mounts fitted to said bearings and self-adjustable with reference thereto, belt engaging pulleys journaled in said mounts, and means for adjusting the bearings to vary the distance between said belt engaging pulleys.

3. In a belt tightener, the combination of a frame having inner bearings intermediate the extremities of opposite side bars and having the latter of wedge form in cross section, bearings having openings of wedge form to receive and interlock with the said wedge bars of the frame, set screws mounted in said inner bearings and in opposite bars of the frame and having screw thread connection with the aforesaid bearings to move the latter, pulley mounts carried by said bearings and self-adjustable with reference thereto, and belt engaging pulleys journaled in said pulley mounts.

4. A belt tightener comprising supporting frames adapted to be mounted upon the shaft of a belt pulley, a pulley frame having adjustable connection with said supporting frames and forming a tie therefor, belt engaging pulleys supported upon the pulley frame, and means for relatively adjusting said belt engaging pulleys to vary the distance between them or to change their relative inclination.

In testimony whereof I affix my signature in presence of two witnesses.

WASHINGTON B. PARRISH. [L. S.]

Witnesses:
V. B. HILLYARD,
W. N. WOODSON.